US012707129B1

(12) United States Patent
Wallace et al.

(10) Patent No.: US 12,707,129 B1
(45) Date of Patent: Aug. 11, 2026

(54) SCENE-AWARE GENERATION OF MUSIC VISUALIZATIONS

(71) Applicant: Amazon Technologies, Inc., Seattle, WA (US)

(72) Inventors: Ian James Wallace, Berkeley, CA (US); Chong Huang, Santa Clara, CA (US); Kevin Thomas Merchant, Oakton, VA (US); Murad Al Haj, Mountain View, CA (US); Surbhi Singhania, San Mateo, CA (US); Mahesh Goud Tandarpally, Seattle, WA (US); Oytun Akman, Oakland, CA (US); Kevin Karsch, Oakland, CA (US); Tal Bar-Or, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 278 days.

(21) Appl. No.: 18/542,306

(22) Filed: Dec. 15, 2023

(51) Int. Cl.

| | |
|---|---|
| ***H04N 7/173*** | (2011.01) |
| ***G06T 11/00*** | (2006.01) |
| ***H04N 5/74*** | (2006.01) |
| ***H04N 21/81*** | (2011.01) |
| ***H04N 21/8547*** | (2011.01) |

(52) U.S. Cl.
CPC .......... *H04N 21/816* (2013.01); *G06T 11/00* (2013.01); *H04N 5/74* (2013.01); *H04N 21/8113* (2013.01); *H04N 21/8547* (2013.01)

(58) Field of Classification Search
CPC .... H04N 21/816; H04N 5/74; H04N 21/8113; H04N 21/8547; G06T 11/00
See application file for complete search history.

(56) References Cited

U.S. PATENT DOCUMENTS

| | | | | |
|---|---|---|---|---|
| 12,469,273 | B2 * | 11/2025 | Chemerys | G06T 11/00 |
| 2024/0095987 | A1 * | 3/2024 | Piramuthu | G06F 40/279 |
| 2024/0161258 | A1 * | 5/2024 | Maschmeyer | G06T 7/70 |
| 2024/0320867 | A1 * | 9/2024 | Bean | G06F 40/30 |
| 2024/0346731 | A1 * | 10/2024 | Graham | G06N 3/044 |
| 2025/0022100 | A1 * | 1/2025 | Wu | G06T 5/50 |
| 2025/0103140 | A1 * | 3/2025 | Todi | G06F 3/013 |
| 2025/0272361 | A1 * | 8/2025 | Horton | G06F 21/1084 |

* cited by examiner

*Primary Examiner* — Annan Q Shang
(74) *Attorney, Agent, or Firm* — K&L Gates LLP

(57) ABSTRACT

Techniques are generally described for scene-aware generation of music visualizations. An example method includes receiving a music sample and a projection surface image, and generating a constraint image based on the projection surface image. The example method also includes generating a sentiment analysis of the music sample and generating an intermediate prompt using the music sample metadata and the sentiment analysis. The example method also includes processing the intermediate prompt using a large language model and generating a subsequent set of keyframe prompts for a latent diffusion model. The example method also includes generating a set of keyframes using the latent diffusion model and generation interpolation images from the keyframes. Finally, the example method includes aligning the keyframes and interpolation images to beats detected in the music sample and generating a music visualization video.

20 Claims, 11 Drawing Sheets

806
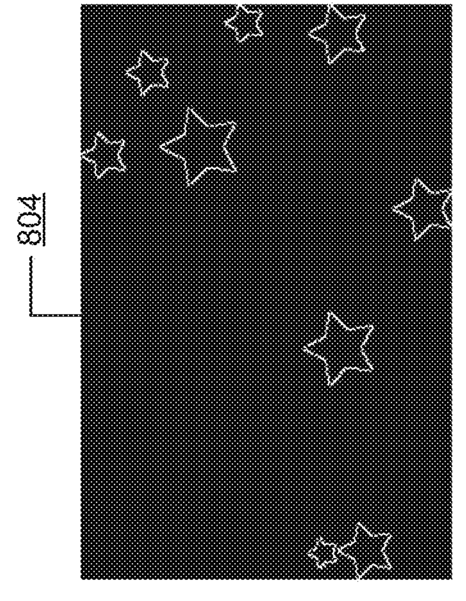
804
808
FIG. 8
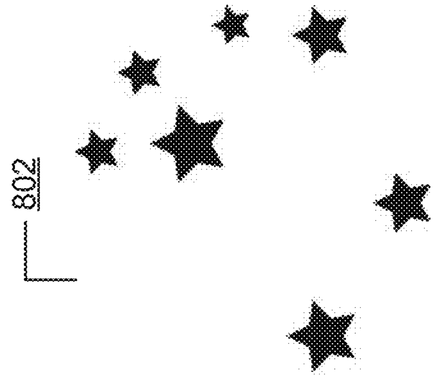
802

SCENE-AWARE GENERATION OF MUSIC VISUALIZATIONS

BACKGROUND

Music visualization provides a visual component to accompany an audio track that generates a multimedia experience from a piece of music. Music visualizations may attempt to incorporate various aspects of the source audio track to provide visual effects that complement each other and create a cohesive and enjoyable experience.

BRIEF DESCRIPTION OF DRAWINGS

FIG. 8 illustrates an example of a constraint image and the application of a lightweight computer vision algorithm to provide an edge-aware output image, in accordance with various aspects of the present disclosure.

DETAILED DESCRIPTION

Figure 1:
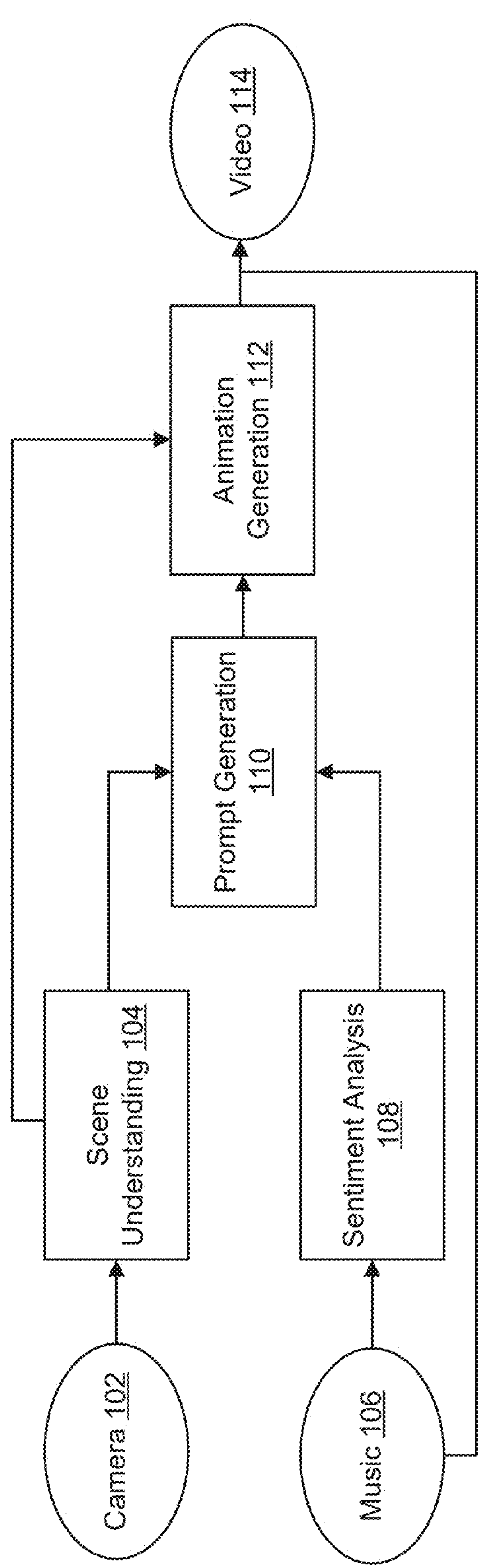
FIG. 1 illustrates an example system effective to provide scene-aware generation of music visualizations, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Described herein are systems, techniques, and interfaces that may be used for scene-aware generation of music visualizations. In accordance with one or more implementations, music visualizations are generated for use with an electronic device comprising a projector. In accordance with one or more implementations, a user may specify a projection surface upon which a music visualization is projected, or a system may automatically determine such a projection surface, e.g. dynamically.

A music sample may be loaded and analyzed for beat detection and sentiment detection purposes. Example systems may generate a series of keyframes aligned with times associated with the beat detection analysis. The keyframes may be images that are generated, for example, using latent diffusion, and may be influenced by several factors including the detected sentiments at the time of the beats, detected visual motifs taken from lyrics of the music sample, metadata of the music sample, and/or detected visual properties of the projection surface such as color, texture, edges, or the like. The keyframes may be arranged in accordance with the detected beats of the music sample, and additional keyframes may be generated to provide smooth visual effects between beats of the music sample using techniques such as image-to-image latent diffusion, interpolation, or other computer vision algorithms. Finally, the keyframes may be combined together with the music sample to create a video file, which may be projected onto the surface previously specified.

Various examples disclosed herein provide end-to-end scene-aware music visualization generation. In various examples, the music visualization generation system may be customized to operate using a steerable projector system. Various examples may incorporate systems and methods for analyzing lyrics and melodies from audio tracks. Various examples may also use analyzed lyrics and melodies to produce animations that capture the emotional essence of a music track. In various examples, scene understanding methods may be incorporated, producing animations that interact with a projection surface, which may be detected by a camera component of a projector system. Furthermore, various examples may operate in different modes depending on the availability of network access, computing power, time (e.g., realtime versus cached) and/or the like by offloading certain operations to cloud computing, utilizing less resource-intensive algorithms for particular steps of the animation generations, and/or the like.

As mentioned above, various examples may include scene-aware music animation prompt generation. The scene-aware music animation prompt generation may integrate scene understanding and music sentiment analysis to create prompts, which may in turn be used to render a plurality of keyframes. In examples in which a system includes a context camera, the context camera may provide a scene image of a projection surface, and the system may process the scene image of the projection surface to determine one or more attributes of the projection surface. For example, the system may determine the texture and/or the color of the projection surface, and may use these attributes to select an appropriate color, pattern, background image, and/or the like for projecting onto the projection surface. Various examples may further analyze lyrics and/or audio of the input music sample and use the analyzed lyrics and/or audio to provide an emotion and/or sentiment analysis of the music sample. Analysis of the lyrics and/or audio of the music sample may ensure a coherent representation when constructing the visuals for the music animation.

The scene-aware music animation prompt generation provides many advantages over previous solutions known in the art. For example, by combining scene understanding (e.g., color, texture, edge detection) and generative models, an optimized visual experience may be created based on the music sample. Furthermore, by summarizing the emotional trajectory of the music sample rather than relying on the lyrics alone to perform text-to-image generation, visually unpleasant images resulting from random lyrics may be avoided, creating a more coherent and pleasant animation.

In addition, various examples disclosed herein may operate in distinct modes based on available resources and operating settings. In some examples, example systems may include an online mode and offline mode for generating animations that may include scene aware elements. Offline mode may use more computationally intensive techniques to generate animations. For example, examples may analyze the outline of the projection surface and use additional networks associated with latent diffusion to incorporate the outline or edge detection and achieve a dynamic, seamless animation effect. Online mode may, in contrast, employ a lightweight computer vision algorithm to incorporate outline or edge detection information into the animation.

The multiple mode adaptive animation generation provides many advantages over previous solutions known in the art. For example, dual online and offline modes may provide improved balance between the efficiency and quality of music visualization generation in different applications. Furthermore, scene-aware animation generation techniques enabled by online mode can provide significant enhancements to the visual interaction effects not possible with other methods.

Various examples disclosed herein represent technical advances that bring improvements to the field of music visualization. Various examples empower users to customize animation effects by configuring rendering methods and image transitions at any timestamp of the video. In particular, by fusing music synchronization and customized rendering, various examples enable visualization of music that is better integrated with the rhythm of the music sample. Furthermore, various examples eliminate the need for the systems to follow a strictly sequential time order for frame rendering, unlocking the potential for real-time rendering through batch processing. Finally, various examples may be customized or tailored particularly for projectors, providing a unique music visualization experience unavailable with existing more generic methods.

Machine learning (ML) and/or artificial intelligence (AI) techniques, such as those described herein, are often used to form predictions, solve problems, recognize objects in image data for classification, etc. For example, ML techniques may be used to detect objects represented in image data and/or translate text from one spoken language to another. In various examples, ML models may perform better than rule-based systems and may be more adaptable as ML models may be improved over time by retraining the models as more and more data becomes available. Accordingly, ML techniques are often adaptive to changing conditions. Deep learning algorithms, such as neural networks, are often used to detect patterns in data and/or perform tasks.

Generally, in ML or AI models, such as neural networks, parameters control activations in neurons (or nodes) within layers of the ML models. The weighted sum of activations of each neuron in a preceding layer may be input to an activation function (e.g., a sigmoid function, a rectified linear units (ReLU) function, etc.). The result determines the activation of a neuron in a subsequent layer. In addition, a bias value can be used to shift the output of the activation function to the left or right on the x-axis and thus may bias a neuron toward activation.

Generally, in ML or AI models, such as neural networks, after initialization, annotated training data may be used to generate a cost or "loss" function that describes the difference between expected output of the ML model and actual output. The parameters (e.g., weights and/or biases) of the ML model may be updated to minimize (or maximize) the cost. For example, the ML model may use a gradient descent (or ascent) algorithm to incrementally adjust the weights to cause the most rapid decrease (or increase) to the output of the loss function. The method of updating the parameters of the ML model is often referred to as back propagation.

Various examples may use latent diffusion, a technique built generative artificial intelligence (GAI). The latent diffusion techniques may include text-to-image and image-to-image modes. Various examples may also use enhancements to latent diffusion that add conditions to the output, such as edge detection, or may use enhancements that configure an animation generation pipeline using latent diffusion.

Latent Diffusion

Latent diffusion models are generative models that may be trained to generate data similar to the data on which they are trained. Latent diffusion models work by injecting Gaussian noise into training data and learning to recover the original training data by reversing the noising process. More specifically, a latent diffusion model is a latent variable model that maps inputs to the latent space using a fixed Markov chain. The Markov chain gradually adds more noise until the input is asymptotically transformed into pure Gaussian noise. The goal of training the latent diffusion model is the reverse process—in order to be able to generate data of interest from noisy input. Latent diffusion models may outperform and/or offer advantages other image generative ML techniques (notably adversarial networks). Additional information on latent diffusion models is provided below.

Diffusion models are generative models that learn the data distribution by reversing a fixed-length Markovian forward process, thereby iteratively denoising a normally distributed variable. In some cases, instead of using the pixel space, denoising can be conducted in a latent space, which is computationally efficient as it reduces the dimension of images. Additionally, use of the latent space omits the high frequency noise within the given image. One example of a latent diffusion models is Stable Diffusion, which includes three main components: A Variational Autoencoder (VAE) to transform the given input in a latent space, a text encoder to process the given text on which image generation is conditioned, and a time-conditioned UNet to predict the noise that is added on the image latents which is conditioned by the text embeddings. Mathematically, the conditioned latent diffusion model can be learned by optimizing the following loss:

$$L_{LDM} = \mathbb{E}_{\varepsilon(x)c,\epsilon,t}\left[\|\epsilon_\theta(z_t, t, c) - \epsilon\|_2^2\right] \quad (1)$$

where, $z_t$ is the latent version of the input $x_t$ provided by the VAE as $z=\varepsilon(x)$. $x_t$ is the noise added version of the input x, at a timestep of t, where $x=\alpha_t x_0+(1-\alpha_t)\epsilon$ and $\alpha_t$ decreases with the timestamp t. Noise is denoted by $\epsilon \sim N(0,1)$. $\epsilon_\theta$ is the UNet. Lastly, c denotes the conditioning variable, and for the text guided models, it is given by processing the given text with the CLIP text encoder.

Operationally, a latent diffusion model may have a text-to-image mode that accepts a text prompt and produces an image. As described above, the CLIP text encoder may be used in some examples to decode a text string and produce tokens that may be mapped to the latent space of the latent diffusion model. In some examples, text prompts may include syntax such as brackets and/or weights to explicitly provide text tokens to the encoder and/or weight the relative importance of text tokens in image generation. For example, the prompt "a (cat:1.5), (green eyes:1.3), (pink nose:1)" will indicate that the cat is the most important element of the image, the green eyes are less important, and the pink nose is less important.

Latent diffusion models may also operate in an image-to-image mode that accepts an image prompt and, optionally, a text prompt. Image-to-image mode uses the same overall architecture as the latent diffusion models described above, but differs in how the image and/or text prompts are mapped to the latent space of the latent diffusion model. The latent diffusion model may include an image encoder that is trained to map images into the latent space. The images in the latent space are then iteratively evolved through the diffusion process as in other latent diffusion applications.

Some latent diffusion models include network structures that are configured to control the diffusion model by incorporating extra conditions. For example, image input may be provided in addition to text and/or image prompt that provides guidelines, segmentation, constraints, conditions, or the like for image generation. Network architectures may be augmented by creating a trainable copy of the encoding layers of the base model, using the original pre-trained model as a backbone for learning conditional controls.

Some latent diffusion models may also be optimized and configured for animation generation. Fundamentally, animation generation may involve the same base principles of latent diffusion described above, with manipulation of the iterative diffusion process and bundling of prompts and outputs to seamlessly produce a video animation.

Furthermore, various examples may utilize techniques for analyzing projection surfaces to determine an ideal projection surface and project an image onto the projection surface. Various examples may further incorporate edge detection to analyze projection surface details and create a seamless animation. Example methods for edge detection are described below.

Edge Detection

In accordance with one or more preferred implementations, an image is first converted to grayscale, and then an edge detection algorithm is utilized, such as a Canny edge detection algorithm, e.g. the cv.Canny( ) function of OpenCV.

In accordance with one or more preferred implementations, after being converted to grayscale, a threshold is utilized to convert a grayscale image to a binary or two-tone image, e.g. a black and white image having value 0 (e.g. corresponding to black) or 1 (e.g. corresponding to white). In a simplistic approach, for example, considering grayscale pixel values between 0 and 255, any pixel values 122 or higher might result in a binary pixel value of 1, while any pixel values below 122 might result in a binary pixel value of 0.

In accordance with one or more preferred implementations, a dynamic thresholding algorithm is used to determine and apply a dynamic threshold for a pixel or portion of an image based on attributes of the image or portions of the image (e.g. portions of the image surrounding a particular pixel).

In accordance with one or more preferred implementations, to facilitate edge detection, a Gaussian filter is applied to smooth noise from the image.

In accordance with one or more preferred implementations, for edge detection, a Sobel operator is used for the denoised image to generate one or more image derivatives, e.g. using a 3×3 Sobel x-filter (or kernel) convolved with the image to generate an x-image-derivative, and using a 3×3 Sobel y-filter convolved with the image to generate a y-image-derivative. This might be done as part of executing a Canny edge detection algorithm.

For each pixel location, an edge gradient magnitude and direction can be determined based on a chosen function, e.g. edge gradient magnitude can be defined for a given pixel (x,y) as sqrt (Gx(x,y)^2+Gy(x,y)^2), and edge gradient direction can be determined for a given pixel (x,y) as tan^−1(Gy(x,y)/Gx(x,y)). Using these determined edge gradient magnitudes and edge gradient directions, some pixel values are suppressed (reduced to zero) if it is determined that they are not a local maximum in its neighborhood in the direction of the gradient.

Subsequently, hysteresis thresholding may be utilized with a first threshold and a second threshold, where any pixels having an adjusted edge gradient value greater than the second threshold are automatically identified as an edge, while any pixels having an adjusted edge gradient value less than the first threshold are automatically identified as not being an edge. Pixels having an adjusted edge gradient value between the first threshold and the second threshold are evaluated to determine whether they are connected to a pixel that has been identified as an edge. If not, they are discarded (e.g. set to zero).

The result is a set of pixel values for the image indicating whether each corresponding pixel is an edge or not. In various examples, the resulting pixel values may be provided as a black and white image which may be provided to algorithms or subroutines of the system to provide edge constraints for image generation. In various examples, transformations may be applied to the resulting pixels to produce a constraint image, including inverting colors, filling outlines, transforming a filled area to an outline, or the like.

Additionally, various examples may incorporate techniques for analyzing music samples to determine various characteristics, such as sentiments or emotions, and the determination of characteristics may be performed as a function of defined time intervals of the music sample. Various examples may further utilize a large language model (LLM) to process the characteristics (e.g., emotions or sentiments) together with lyrics, metadata, or other data and produce prompts for keyframe generation. Various examples may further use beat detection to determine suitable timestamps where scene transitions may be performed in the animation to synchronize pleasantly with the music sample.

Sentiment analysis may involve determining the emotional tone or sentiment of a music sample, and may further include sentiments arranged according to a plurality of timestamps of the music sample. Many procedures for sentiment analysis exist, and may use audio analysis, lyric analysis, or both. Lyric analysis may include natural language processing techniques to extract the sentiment of the lyrics, extracting sentiments from individual words, phrases and/or longer multi-phrase structures. Audio analysis may extract pitch, intensity, and other audio features from the entire music sample or in time series. In some sentiment analysis methods, lyric and audio analysis may proceed in tandem, and lyrics may be aligned to times from the audio track. The results of intermediate analyses of the audio and lyrics may be performed and provided to an AI model trained to classify music samples and identify one or more known sentiments.

Large Language Models

A generative LLM is an artificial intelligence (AI) model that may be capable of processing and generating humanlike text based on the latent information it has learned from vast amounts of training data. The term "large" refers to the size of these models in terms of the number of parameters or weights, which are the values that the model learns during training to make predictions and/or generate output such as text, synthesized speech, control instructions for control of other devices, etc. LLMs may have millions, billions (or even more) parameters, which enable such models to capture complex patterns and nuances in language that, in turn, allow the models to process and generate more natural-sounding text (relative to previous approaches). LLMs are typically trained on massive datasets that include a wide variety of text from various sources, enabling the LLMs to "understand" grammar, context, and the relationships between words, sentences, paragraphs, etc. Examples of LLMs include the generative pre-trained transformer models (e.g., GPT-3, GPT-4), Pathways Language Model (PaLM), Large Language Model Meta Artificial Intelligence (LLaMA), as well as non-generative examples such as BERT (bidirectional encoder representations from Transformers), etc.

In a generative context, an LLM may generate text that is responsive to the input prompt provided to the LLM. LLMs excel at generating natural sounding text that appears as though it has been generated by a native speaker in the relevant language. In addition to fluency, generative LLMs are able to generate detailed, relevant, and largely accurate responses to input prompts in many cases due to the large amount of latent information the generative LLM has learned during training. The term "prompt" may refer to plain text or structured text, and may be provided via an interface to the LLM, such as an API. The prompt may generally be written in natural language, expressed, for example, as if requesting a task to be performed by the LLM (e.g., "You are tasked with generating a visualization for a music sample using the following guidelines").

In various examples described herein, LLM-based natural language processing may generate prompt data for a given input request (e.g., a text transcription of a given spoken request, generated using automatic speech recognition (ASR)). The prompt data may be augmented with various context data (a process sometimes referred to as "grounding") and may be input into the LLM. For example, a user may request "What is the best restaurant located nearest to the tallest mountain in California?" The prompt data generated for this request may instruct the LLM to break the request down into a number of sub-tasks for solving the problem. The prompt data may also include various other context such as a device ID of a device used to input the request, time of day, day of year, account ID, previous turns in a current dialog session, etc.

Beat detection of audio samples involves identifying times in the audio sample that correspond to regular rhythms. Music samples generally include a repetitive structure that corresponds to the beat, such as a short-duration increased intensity in the low frequency range that corresponds to a bass drum, or the like. Pre-processing may be performed to remove pieces of the music sample that do not follow a regular rhythm, such as spoken word or interlude sections, and the remainder may be processed with signal processing techniques to determine spectral content. Beat detection may apply onset detection on the decomposed music sample to identify points in the sample where sound events begin, such as the attack of a bass drum hit. The collected onsets from the music sample may be collected and analyzed to find recurring patterns, such as a periodicity in onsets at certain frequencies, which provides one or more probable tempos for the music sample. Given that tempos can vary throughout a song, some variation is allowed in the detection of beats rather than assuming a strict mechanical precision to the tempo. Additionally or alternatively, AI models may be trained on music sample data, including onset detection outputs, to determine beats in a music sample. Further steps may be taken to identify and account for instances in which macroscopic tempo changes occur during a track, whether the tempo changes are continuous or discontinuous.

Furthermore, when operating in a dynamic mode that requires lower processor usage, various examples may incorporate computer vision algorithms to efficiently process keyframes and generate animations. For example, Gaussian blur and hue adjustment may produce varied and interesting animation effects. Additionally, such effects may be less compute intensive relative to some of the other animation generation techniques described herein, and therefore may be well suited to real-time scene-aware generation of music visualizations in an online, streaming context, in accordance with various aspects described herein.

Gaussian blur applies blurring of an image using a Gaussian function for each pixel. The Gaussian blur uses a two-dimensional Gaussian function to construct a convolution matrix which is applied to the image. For each pixel, the Gaussian convolution matrix re-sets the value of the pixel based on the values of neighboring pixels according to a Gaussian centered on the pixel. In other words, the original pixel has the largest influence on the resulting pixel value, and pixels farther away have reduced influence on the resulting pixel value, where the weight applied to distance pixels decays as a Gaussian function.

FIG. 1 illustrates an example system effective to provide scene-aware generation of music visualizations, in accordance with various aspects of the present disclosure. The system is depicted in terms of the flow of data from inputs and outputs, depicted as ovals, from data sources including the camera 102 and the input music 106 to the output, which is the video 114. Data processing steps are depicted by the boxes: scene understanding 104, sentiment analysis 108, prompt generation 110, and animation generation 112, while flows of data are represented as arrows connecting boxes and/or ovals. It will be understood that the steps depicted in FIG. 1 are an example implementation, and various examples may include additional data processing steps (e.g., edge detection) or additional input/output sources (e.g., a microphone) or may remove certain elements from the process depicted in FIG. 1. Likewise, some examples may include additional data flows depicted by arrows in FIG. 1, or lack certain connections that FIG. 1 depicts.

The camera 102 may provide input to an example as a still image or collection of video frames. The camera 102 may provide an image of the projection surface area, or the entire room or area into which the video will be projected. The hardware embodying the camera 102 is described in greater detail below in connection with FIG. 9. The image or collection of images provided by the camera 102 may be any resolution or color depth, depending on the example. As depicted in FIG. 1, the camera 102 may provide image data to the scene understanding 104. The image data provided by the camera 102 may be effective for various scene understanding tasks, including but not limited to extracting visual characteristics of the projection surface, detecting contours or edges of the projection surface, determining an environmental change to the status of the projection surface, or the like.

Various examples disclosed herein may perform a scene understanding 104 step using image data from the camera 102. The scene understanding may include such steps as determining characteristics of the projection surface and/or detection of edges or contours in and around the projection surface. In various examples, performing scene understanding 104 may include a rules-based processing of the projection surface, for example, to extract a color, pattern, reflectivity, or other properties of the projection surface. In various examples, the scene understanding 104 may include an ML or AI classifier that determines the properties using pixels of one or more frames of image data representing the projection surface as input.

The scene understanding 104 may produce one or more visual characteristics of the projection surface. The visual characteristics may be a string or collection of strings describing a characteristic of the surface, for example, "pale yellow," "smooth," "sky blue" or the like. In various examples, the visual characteristics may be encoded in a particular representation, for example, as an integer that may be mapped to a particular visual characteristics such as RGB values, reflectivity, or the like. However the visual characteristics are represented, the scene understanding 104 may produce one or more visual characteristics effective to provide prompt generation 110 with various information describing visual properties of the projection surface.

The scene understanding 104 may produce an analysis of the edges or contours of the projection surface. The scene understanding 104 may utilize edge detection algorithms, described above, and produce various outputs such as constraint images, masks, detected outline images, or the like. The edge detection output may be a visual format, such as an image that removes detail extraneous to edge detection and clearly depicts edges found in the projection surface. The output of the edge detection algorithms (e.g., constraint images, masks, outline images, etc.) may be transformed or rotated by various transformation algorithms to reposition the constraints to be used in subsequent processes. For example, the constraints may be repositioned in an instance in which the camera 102 is oriented differently than the projector. In various examples, scene understanding 104 may use multiple steps to first detect a constraint image and transform the constraint image to a detected outline or other representations of the edges, contours, or constraints. The edge or contour detection output may be provided to the prompt generation 110 and/or the animation generation 112. For example, the detected edges may be provided as a constraint or condition to a latent diffusion model as a component of the animation generation 112 step to create an edge-aware image to create a dynamic scene-aware animation.

Various examples may utilize music 106, which may be received from a network source, internal storage, recorded via attached sensor hardware, or the like. The music 106 may include a music sample or may also be spoken word such as an audiobook or podcast, ambient sound such as nature recordings, or any other audio file. The music 106 may include metadata such as the artist or producer, lyrics, duration, details of the audio production such as the genre, date recorded, production credits, and/or the like. In various examples the music 106 may be provided together with beat detection, or beat detection may be performed using local hardware, or certain beat detection routines may be provided by a remote host and received via a network connection. The music may be provided to sentiment analysis 108, or in various examples, pre-processing may be performed such as bitrate reduction, rules based and/or ML/AI analysis of the music sample, or the like.

The sentiment analysis 108 may be performed using the music 106, and may be performed locally or using a remote host, which may provide the sentiment analysis 108 via a network connection. In various examples, the sentiment analysis 108 may be performed previously and the resulting sentiment analysis 108 may be retrieved from storage or, for example, retrieved together with music 106 via a network connection. The sentiment analysis 108 may produce output in any of a variety of forms, including a plain text description of music sentiments, a structured plain text format (e.g., XML, JSON, YAML, or the like), binary data, an application programming interface (API) call, and/or the like, which express a time series of musical sentiments. The output may, in various examples indicate musical sentiments structured according to any particular musical structure (e.g., using timestamps, musical sections, or the like). The musical sentiment analysis 108 may be effective to produce a description of emotional characteristics, for example, "calm," "energetic," joyful," "aggressive," "melancholy," "triumphant," "celebratory," or the like. In various examples, other musical characteristics, not necessarily including sentiments, may be produced by the analysis (e.g., time signatures, chords, modality, rhythmic patterns, vocal style, instrumentation, or the like). The musical characteristics may be determined, stored, transmitted, and recorded in the same manner as described for musical sentiments. It will be understood that descriptions of musical sentiment analysis 108 herein may also apply for dynamic analysis of more general musical characteristics. Output of the sentiment analysis 108 may be provided to the prompt generation 110.

Prompt generation 110 may produce a text prompt used for a GAI model in connection with animation generation 112 to generate keyframes which may be combined to form a music visualization animation. The prompt generation 110 may include sub-steps, described below in connection with FIGS. 10A-10B, including a LLM to produce a visualization prompt using an intermediate prompt. The prompt generation may collect and assemble a variety of information sources including sentiment analysis 108, scene understanding 104, and, in various examples, additional information from camera 102 and music 106 such as low-level visual information, music metadata, and/or the like. The prompt generation 110 may produce a prompt or prompts including one or more of plain text, structured plain text (e.g., XML, JSON, YAML, or the like), API calls, binary data, or the like. The prompt generation 110 may produce as output the prompt for a latent diffusion model component of the animation generation 112, or may produce a general prompt that subsequent operations may reformat to provide for animation generation 112. The prompt generation 110 may produce prompts, sub-prompts, variations of a prompt, prompts including variables or parameters, or the like, that may vary throughout the duration of the music 106 sample, in order to produce an animation effect.

Animation generation 112 may include latent diffusion models or other GAI models that are effective to produce keyframes for an animation or may include functionality to directly produce one or more animations that the video 114 may comprise. In various examples, the animation generation 112 may directly use output of the scene understanding 104 to incorporate edge or contour detection to provide animation that is dynamic and interacts with scenery of the projection surface. Animation generation 112 may further include interpolation and/or other algorithms for generating intermediate frames between keyframes, the details of which are described below in connection with FIGS. 10A-10B. The animation generation 112 may provide output in the form of image data, video data, and/or the like, which may be structured according to any of a variety of formats, such as a directory containing image files, binary data, or the like. In various examples, the animation generation 112 output may be processed to result in a finalized video file, which may be formatted, compressed, and/or the like for finalized video playing and projection.

Finally, the output is produced in the form of a video 114. The video 114 may be provided to output or display hardware, such as a projector, to be projected to a user. The video 114 may be rendered to include the music 106 as the audio track. In various examples, the video 114 may modify the original music 106 to include a different audio track, for example, by adding audio effects or by reformatting the music 106 to change the bitrate, quality, and/or the like.

Figure 2:
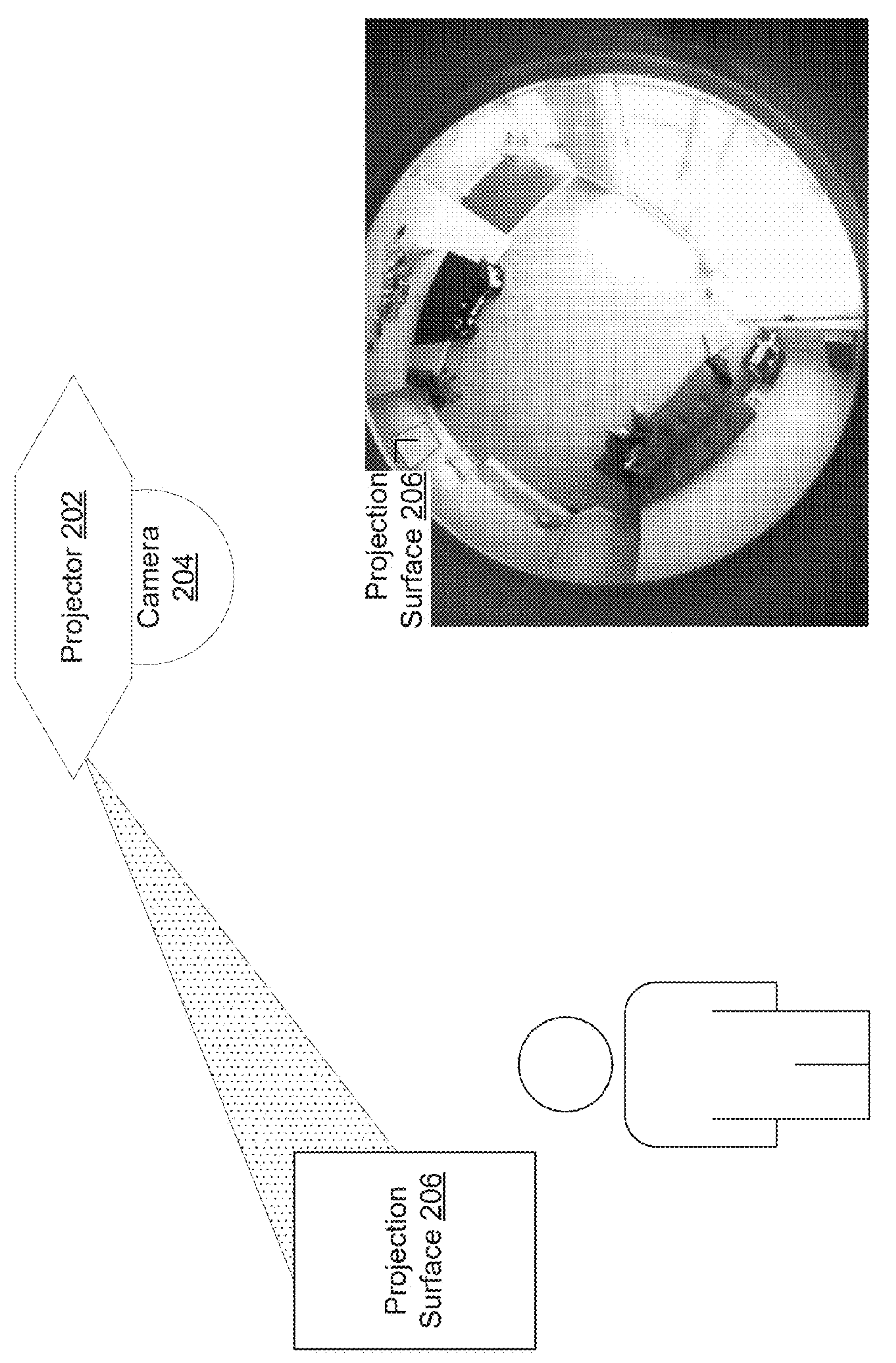
FIG. 2 illustrates an example environment in which components of a system effective to provide scene-aware generation of music visualizations may operate, in accordance with various aspects of the present disclosure.

FIG. 2 illustrates an example environment in which components of a system effective to provide scene-aware generation of music visualizations may operate, in accordance with various aspects of the present disclosure. The system may include a projector 202 and a camera 204, both of which are described in further detail in connection with FIG. 9. The camera 204 may gather information about the surroundings of the environment in which the system is placed, and in particular may detect information about a projection surface 206. The camera may be a wide-angle or fisheye lens, as depicted here in FIG. 2, and may receive additional information beyond the bounds of the projection surface 206. The information from the camera 204 may include color, texture, or other visual properties of the projection surface 206 and may further include shapes of boundaries, edges, or other environmental effects surrounding the projection surface 206 and/or within the boundary of projection surface 206. The system may produce a music visualization animation which may be subsequently projected onto the projection surface 206 by the projector 202. The projector 202 may be a steerable projector, able to project the music visualization animation onto the projection surface 206. The system is depicted here comprising projector 202 and camera 204, however, it will be understood that example systems may include additional hardware or components not pictured in FIG. 2, in particular speakers, a microphone, network and power cabling, and/or the like.

Figure 3:
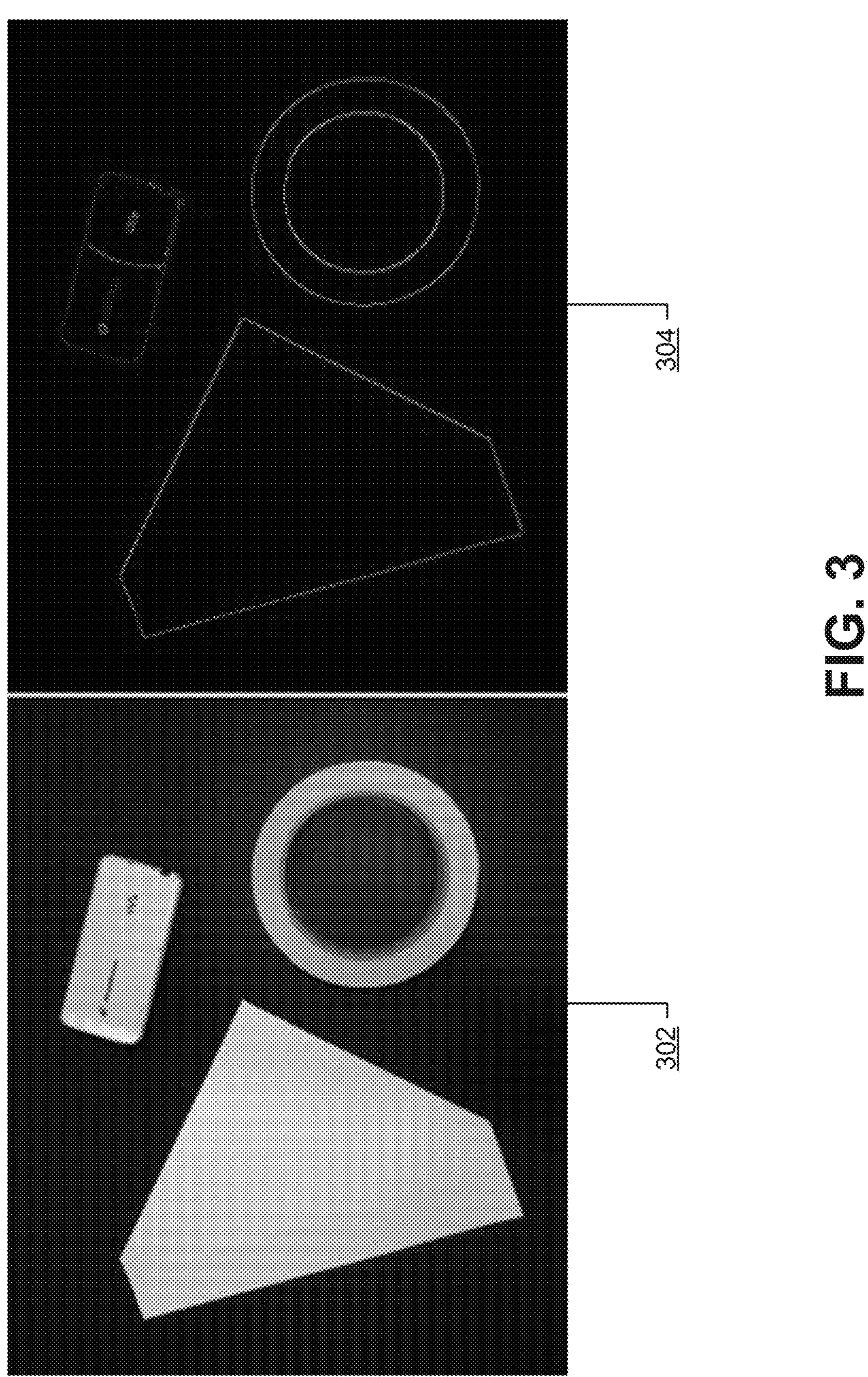
FIG. 3 illustrates an example of edge detection performed on a sample image, in accordance with various aspects of the present disclosure.

FIG. 3 illustrates an example of edge detection performed on a sample image, in accordance with various aspects of the present disclosure. The left image 302 shows an example surface with objects within the boundary of the surface, and the right image 304 shows an example edge detection output, where detected edges are shown as white pixels and non-edge areas are black pixels. The right image 304 exemplifies the output from an edge detection algorithm, which may be part of a scene understanding process (such as scene understanding 104 in FIG. 1, described above). The edge detection image, corresponding to the right image 304, may be provided to various process for the incorporation of edge detection information into the music visualization video. It will be understood that FIG. 3 illustrates one example input and output of edge detection, and various examples disclosed herein may use different styles of edge detection which may produce varying outputs (e.g., the right image 304 may include filled areas corresponding to regions where an image will not be projected, rather than outlines alone).

Figure 4:
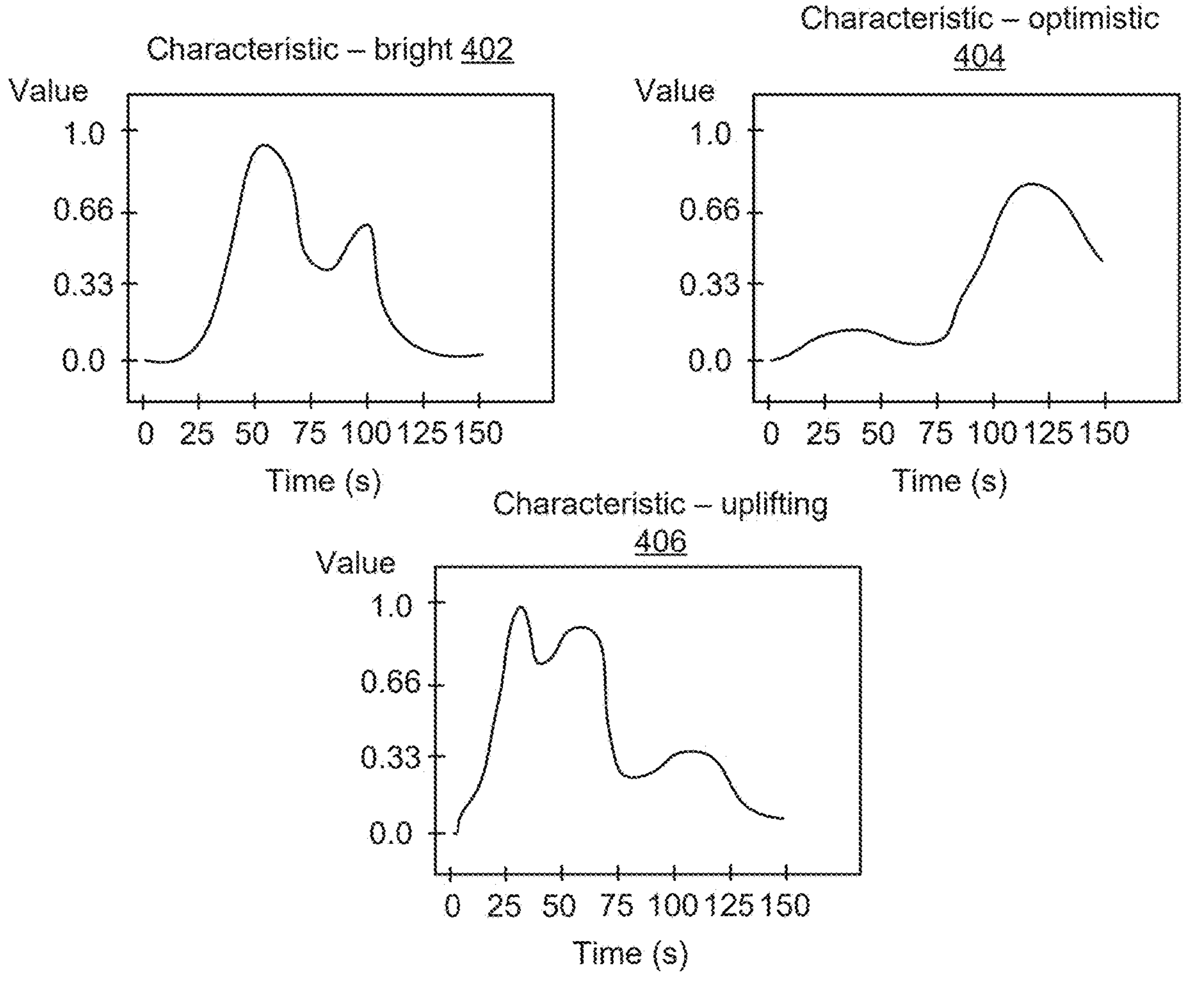
FIG. 4 illustrates several examples of characteristic analysis of a music sample, in accordance with various aspects of the present disclosure.

FIG. 4 illustrates several examples of characteristic analysis of a music sample, in accordance with various aspects of the present disclosure. As described previously in connection with sentiment analysis 108 of FIG. 1, characteristic analysis or sentiment analysis may produce data indicating various characteristics of music, and the characteristics may be described according to various structures of the music, such as timing of the music sample. For example, the sentiment analysis for characteristic-bright 402 shows a characteristic value that ranges from zero to one, and has assigned values from time zero up to 150 seconds. It will be understood that in various examples, the characteristic analysis may produce a discrete set of characteristic values at various time stamps, and a subsequent algorithm may transform the discrete set of time stamp values to produce a continuous curve as shown in FIG. 4. The continuous curve may be produced by simply interpolating between the discrete points, or more intricate expressions may be used to produce the continuous distribution. FIG. 4 also shows example plots for characteristic-optimistic 404, and for characteristic-uplifting 406, which illustrate similar continuous curves with characteristic values provided for different times of the music sample.

Figure 5:
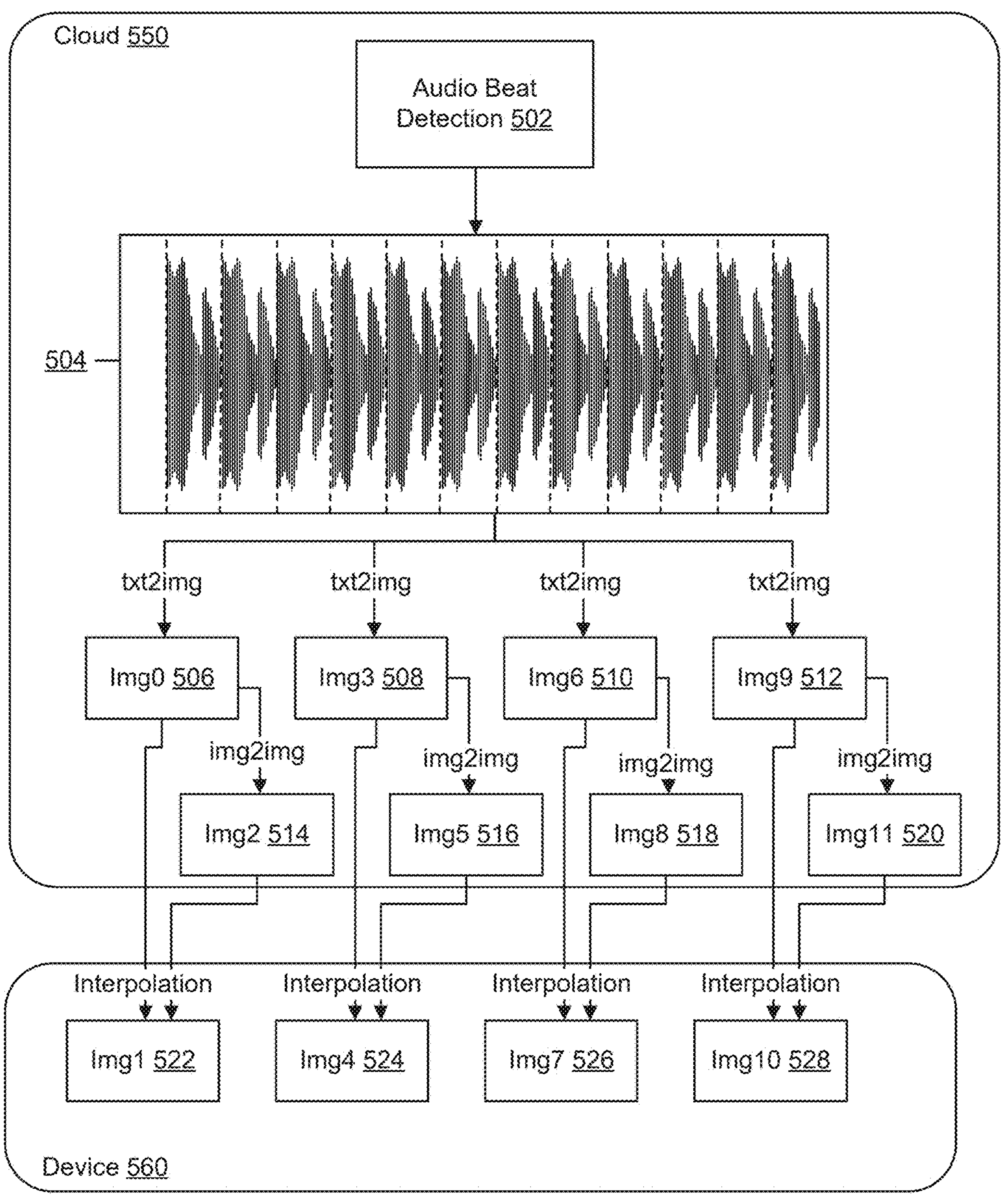
FIG. 5 illustrates a flow chart depicting an example method for generating keyframes using audio beat detection in offline mode, in accordance with various aspects of the present disclosure.

FIG. 5 illustrates a flow chart depicting an example method for generating keyframes using audio beat detection in offline mode, in accordance with various aspects of the present disclosure. As introduced previously, various examples disclosed herein may use a dual mode configuration or multiple mode configuration, where the modes may be switched dynamically depending on the conditions in which the system operates. The offline mode of FIG. 5 is one example mode in which various examples may operate, and the offline mode is ideal for a situation in which more computing power and time are available for generation of the visualization, while still taking steps to optimize the generation of keyframe images in parallel to efficiently use available resources. The offline mode may perform certain operations on a remote device, the cloud 550, and certain operations locally on the device 560. The cloud 550 may perform audio beat detection 502 on the music sample to identify a series of time stamps in the music sample in which a beat subdivision (e.g., a timing corresponding to a detected rhythm of the music sample) may be found. The beat subdivisions are illustrated by the waveform 504, which depicts a wave form, where the horizontal access is time and the vertical axis is intensity, and vertical dashed lines indicate times where a beat is detected. Upon detecting beat timestamps in the waveform 504, the cloud 550 may use latent diffusion in text-to-image mode to generate a sequence of keyframe images, labeled as "Img0" 506, "Img3" 508, "Img6" 510, and "Img9" 512. The prompts used to generate the text-to-image images are produced as part of the prompt generation 110 described at a high level in connection with FIG. 1, and described in further detail in FIGS. 10A-10B. The text-to-image images "Img0" 506 through "Img9" 512 may be produced and later positioned to coincide with the timestamp of a corresponding detected beat indicated in the waveform 504. The latent diffusion generation of text-to-image images is performed using cloud 550 in parallel, as the prompt generation may provide a plurality of prompts for each beat timestamp detected in the audio beat detection 502, and the cloud 550 may be equipped with multiple processors and sufficient computing power to handle the generation of "Img0" 506 through "Img9" 512 in parallel.

As shown, the text-to-image images "Img0" 506 through "Img9" 512 may be used as input to generate the set of image-to-image images using latent diffusion, resulting in "Img2" 514, "Img5" 516, "Img8" 518, and "Img11" 520. As with the text-to-image generation, the image-to-image generation may use computationally heavy latent diffusion, which may be processed in parallel using the capabilities of the cloud 550. Finally, interpolation of the text-to-image and the image-to-image keyframes may be performed locally by device 560, resulting in interpolation images such as "Img1" 522, "Img4" 524, "Img7" 526, and "Img10" 528. In various examples, the interpolation may not use a latent diffusion model, but may instead use a more computationally lightweight interpolation model that may be processed using the processing capabilities of the local device, device 560.

Figure 6:
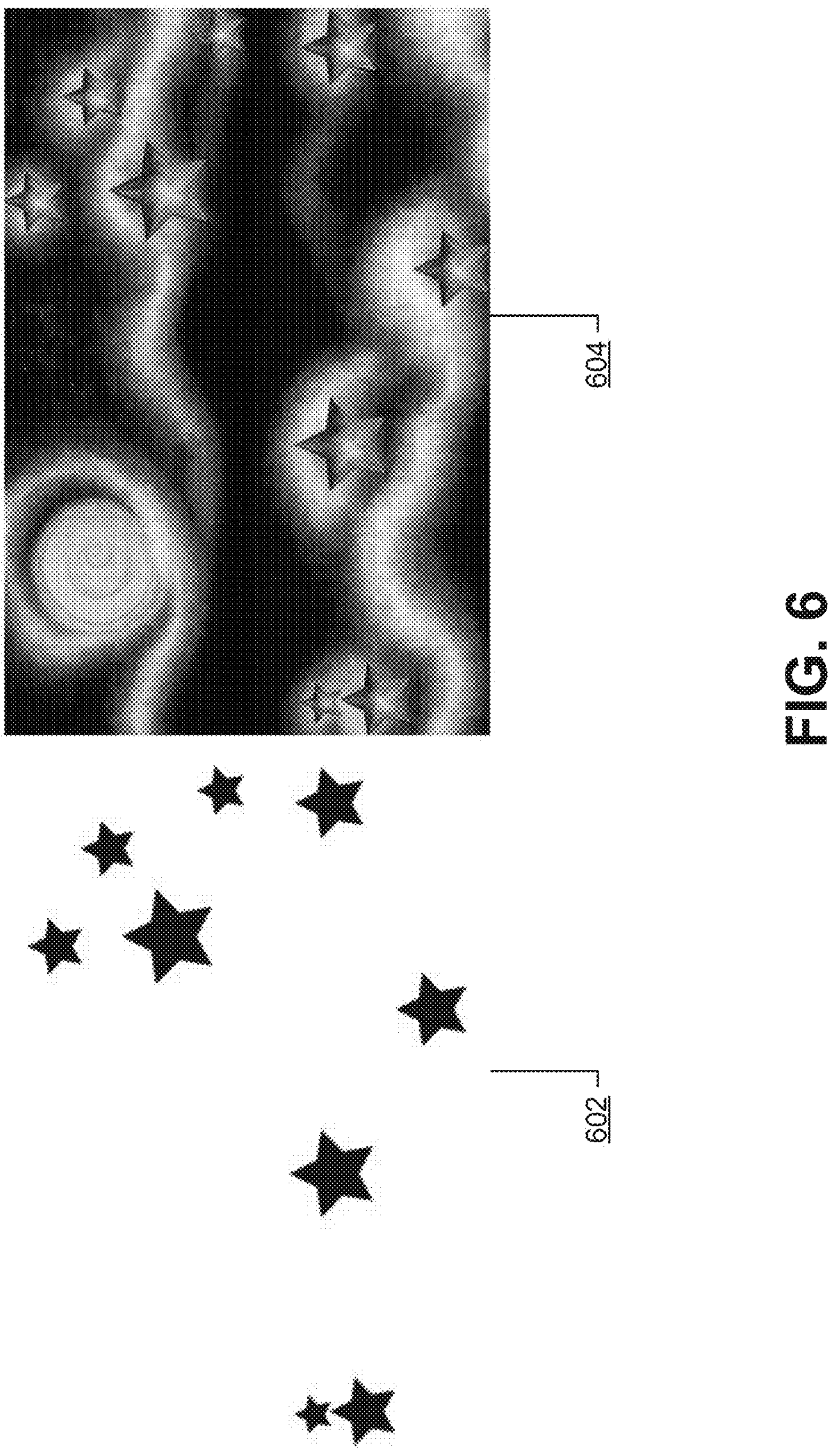
FIG. 6 illustrates an example of a constraint image and an example image generated using the constraint, in accordance with various aspects of the present disclosure.

FIG. 6 illustrates an example of a constraint image and an example image generated using the constraint, in accordance with various aspects of the present disclosure. The left image 602 exemplifies the output of an edge detection process, such as the edge detection illustrated in connection with FIG. 3. Note that the left image 602 appears differently formatted than the edge detection output of FIG. 3, shown in the right image 304. As discussed previously, various transformations may be applied to the edge detection output such as inverting colors and/or filling in contours. In the left image 602, contours or "filled" space are depicted as black pixels while the open projection surface is depicted as white pixels. The right image 604 illustrates an example image generated using a latent diffusion model including an edge-aware extension. In the example of the right image 604, an image was generated using the text prompt "van gogh starry night" and the left image 602 was provided to the latent diffusion model as a constraint image. The edge-aware latent diffusion generation of FIG. 6 illustrates a sophisticated boundary detection method that may be used to create dynamic animations that may appear to interact with or flow around various objects in the room that border the projection surface. The procedure of including the edge constraints of left image 602 in a latent diffusion prompt may be utilized in instances in which sufficient computing power is available, for example in the offline mode depicted above in connection with FIG. 5.

Figure 7:
FIG. 7 illustrates examples of image-to-image generation using lightweight computer vision algorithms, in accordance with various aspects of the present disclosure.

FIG. 7 illustrates examples of image-to-image generation using lightweight computer vision algorithms, in accordance with various aspects of the present disclosure. As discussed previously, various examples may operate dynamically in multiple modes depending on available resources. The images of FIG. 7 illustrate various lightweight image transformations that may be performed either in an online mode with limited time and/or computing capability, or may be produced by a local device such as device 560 of FIG. 5 in offline mode. The top left image 702 and the top right image 704 illustrate a Gaussian blur transformation, a widely-used image processing technique that is adept at noise reduction and detail smoothing. The transformation applies a Gaussian function to treat each pixel within the image, resulting in the top right image 704 that appears blurrier than the top left image 702.

The bottom left image 706 and the bottom right image 708 illustrate an example of a hue adjustment transformation. For example, the wing and tail feathers of the bird in the bottom left image 706 may appear blue in color. These blue colored feathers may be from bottom left image 706 may be transformed to a green color in the bottom right image 708. The hue adjustment transformation may cause an image's colors to undergo modification by shifting their hue or tint. By adjusting the hue, the transformation may effectively move all colors in the image along the color spectrum, enabling transformations such as changing red to blue or green to yellow.

FIG. 8 illustrates an example of a constraint image and the application of a lightweight computer vision algorithm to provide an edge-aware output image, in accordance with various aspects of the present disclosure. As discussed previously, various examples may operate dynamically in multiple modes depending on available resources. The images of FIG. 8 illustrate various lightweight edge-aware transformations that may be performed in an online mode with limited time and/or computing capability, which may be contrasted with the more computationally heavy constraint image technique described previously in connection with FIG. 6. The constraint image 802 may be received from an edge detection algorithm, such as the edge detection example described previously in connection with FIG. 3. In various examples, the constraint image may be processed by inverting colors, filling in outlines, transforming filled shapes into unfilled outlines, or the like. The detected outline 804 illustrates a transformation of the constraint image 802 effective for the lightweight algorithm depicted in FIG. 8. The source image 806 illustrates an example image to which the lightweight edge-aware algorithm may be applied. The source image 806 may be produced, for example, with a latent diffusion model with the prompt text "van gogh starry night." Note that in this example, unlike the example described above in connection with FIG. 6, the constraint image 802, the detected outline 804, or any other image data are not provided to the latent diffusion model, and so the source image 806 does not include any awareness of the detected images illustrated here. The output image 808 shows the output of the lightweight edge-aware algorithm. For example, a dilation transformation may be applied to expand the detected outline 804 by adding pixels to the image when overlaid with source image 806. The most extreme outlier pixels in the resulting image may be identified and set as the color of the outline to improve visibility of the outline, as seen in the output image 808.

Figure 9:
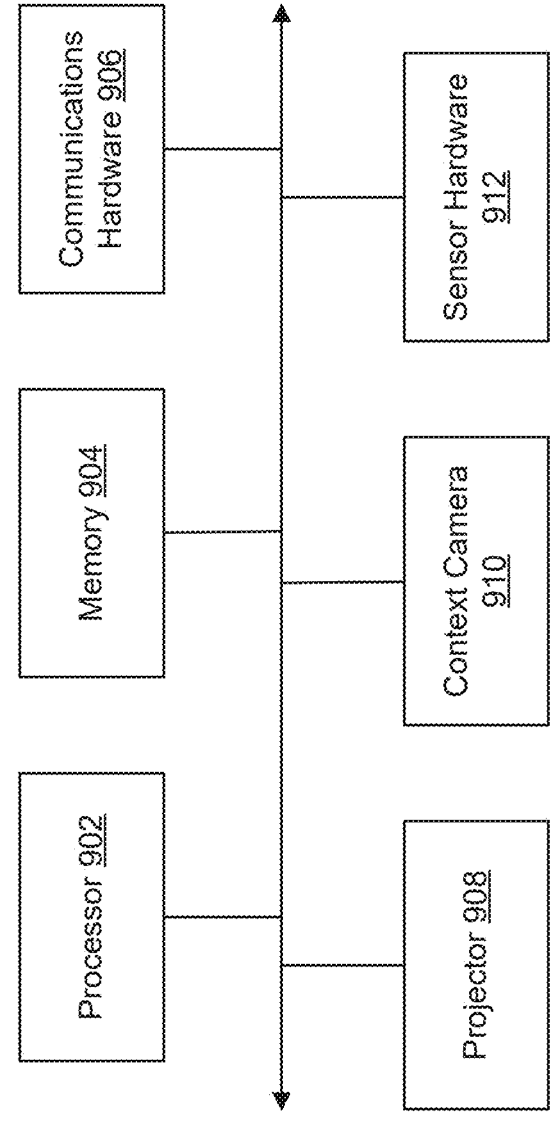
FIG. 9 is a diagram illustrating an example apparatus for providing scene-aware generation of music visualizations that may be used in accordance with various aspects of the present disclosure.

FIG. 9 is a diagram illustrating an example apparatus for providing scene-aware generation of music visualizations that may be used in accordance with various aspects of the present disclosure. The music visualization (described previously with reference to FIG. 1) may be embodied by one or more computing devices, shown as apparatus 900 in FIG. 9. The apparatus 900 may be configured to execute various operations described above in connection with FIG. 1 and below in connection with FIGS. 10A-10B. As illustrated in FIG. 9, the apparatus 900 may include processor 902, memory 904, communications hardware 906, projector 908, context camera 910, and sensor hardware 912, each of which will be described in greater detail below.

The processor 902 (and/or co-processor or any other processor assisting or otherwise associated with the processor) may be in communication with the memory 904 via a bus for passing information amongst components of the apparatus. The processor 902 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 900, remote or "cloud" processors, or any combination thereof.

The processor 902 may be configured to execute software instructions stored in the memory 904 or otherwise accessible to the processor. In some cases, the processor may be configured to execute hard-coded functionality. As such, whether configured by hardware or software methods, or by a combination of hardware with software, the processor 902 represent an entity (e.g., physically embodied in circuitry) capable of performing operations according to various examples of the present invention while configured accordingly. Alternatively, as another example, when the processor 902 is embodied as an executor of software instructions, the software instructions may specifically configure the processor 902 to perform the algorithms and/or operations described herein when the software instructions are executed.

Memory 904 is non-transitory and may include, for example, one or more volatile and/or non-volatile memories. In other words, for example, the memory 904 may be an electronic storage device (e.g., a computer readable storage medium). The memory 904 may be configured to store information, data, content, applications, software instructions, or the like, for enabling the apparatus to carry out various functions in accordance with various examples contemplated herein.

The communications hardware 906 may be any means such as a device or circuitry embodied in either hardware or a combination of hardware and software that is configured to receive and/or transmit data from/to a network and/or any other device, circuitry, or module in communication with the apparatus 900. In this regard, the communications hardware 906 may include, for example, a network interface for enabling communications with a wired or wireless communication network. For example, the communications hardware 906 may include one or more network interface cards, antennas, buses, switches, routers, modems, and supporting hardware and/or software, or any other device suitable for enabling communications via a network. Furthermore, the communications hardware 906 may include the processing circuitry for causing transmission of such signals to a network or for handling receipt of signals received from a network.

The communications hardware 906 may further be configured to provide output to a user and, in various examples, to receive an indication of user input. In this regard, the communications hardware 906 may comprise a user interface, such as a display and audio speakers. In various examples, the apparatus 900 may be limited to the use of the projector 908 for providing visual output to the user in conjunction with the attached audio speakers of the communications hardware 906. In various examples, the communications hardware 906 may include a keyboard, a mouse, a touch screen, touch areas, soft keys, a microphone, a speaker, and/or other input/output mechanisms. In various examples, the user interface of the apparatus 900 may be limited to voice commands, which may be detected by sensor hardware 912, described below, and in this instance the communications hardware 906 may not include an attached keyboard, mouse, touch screen, or the like. The communications hardware 906 may utilize the processor 902 to control one or more functions of one or more of these user interface elements through software instructions (e.g., application software and/or system software, such as firmware) stored on a memory (e.g., memory 904) accessible to the processor 902.

The projector 908 may be a steerable projector effective to project images at a resolution and rate needed to produce an animation effect to accompany a music sample. In various examples, the projector 908 may include motorized components, flexible cabling, power supply, lighting, mirrors, additional cameras, heat sinks, rotating brackets, and other componentry required to enable the projector 908 to project images to a projection surface identified in a space. The projector 908 may include or be in communication with additional systems that may identify a projection surface. The projection surface may be identified by coordinates in a pre-determined coordinate system, and the projector 908 may include capabilities to rotate, focus, and adjust projection onto the projection surface upon being provided with the coordinates of the projection surface. In various examples, the projector 908 may automatically compensate for coordinates or other indications of the projection surface by transforming the coordinates, either using processor 902 or processing capabilities of the projector 908 to automatically transform coordinates and determine a realizable projection surface from intermediate projection surface data.

The context camera 910 may serve to collect information about the projection surface and/or the wider space in which the apparatus 900 is situated. The context camera 910 may include color (RGB) imaging capabilities to receive color information about the projection surface. In various examples, the context camera 910 may be configured to identify environmental obstacles to projecting, including humans, pets, movable objects, and/or the like to provide updated information concerning the condition of the projection surface (e.g., the context camera 910 may provide an alert if a pet moves in front of the projection surface, which may trigger the system to identify a new projection surface and move projector 908 to the new projection surface).

The context camera 910 may serve to provide important visual information about the projection surface, including the color, texture, reflectivity, and other properties of the projection surface. The context camera 910 may further provide an image of the projection surface for the purposes of edge or contour detection, described above in connection with FIGS. 3, 6, and 8, and below in connection with FIGS. 10A-10B. In various examples, the context camera 910 may include dedicated hardware for transforming the distorted wide-angle images from the camera to rectilinear images, or the context camera 910 may rely on processor 902 for transforming images.

The sensor hardware 912 may include various components used to provide additional information to the music visualization system such as microphones, infrared sensors, or the like. In various examples, the generation of a music visualization may be triggered by a voice command, which may be received by a microphone of the sensor hardware 912. In various examples, a microphone of the sensor hardware 912 may receive various commands that may modify the generation of the music visualization (e.g., "use this image" or "give me a different visualization"), or playback commands (e.g., "pause" or "resume").

Although components 902-912 are described in part using functional language, it will be understood that the particular implementations necessarily include the use of particular hardware. It should also be understood that certain of these components 902-912 may include similar or common hardware. For example, the communications hardware 906, projector 908, context camera 910, and sensor hardware 912 may each at times leverage use of the processor 902 or memory 904, such that duplicate hardware is not required to facilitate operation of these physical elements of the apparatus 900 (although dedicated hardware elements may be used for any of these components in various examples, such as those in which enhanced parallelism may be desired).

Although the projector 908, context camera 910, and sensor hardware 912 may leverage processor 902, memory 904, or communications hardware 906 as described above, it will be understood that any of projector 908, context camera 910, and sensor hardware 912 may include one or more dedicated processor, specially configured field programmable gate array (FPGA), or application specific interface circuit (ASIC) to perform its corresponding functions, and may accordingly leverage processor 902 executing software stored in a memory (e.g., memory 904), or communications hardware 906 for enabling any functions not performed by special-purpose hardware. In various examples, however, it will be understood that projector 908, context camera 910, and sensor hardware 912 comprise particular machinery designed for performing the functions described herein in connection with such elements of apparatus 900.

In various examples, various components of the apparatus 900 may be hosted remotely (e.g., by one or more cloud servers) and thus need not physically reside on the corresponding apparatus 900. For instance, some components of the apparatus 900 may not be physically proximate to the other components of apparatus 900. Similarly, some or all of the functionality described herein may be provided by third party circuitry. For example, a given apparatus 900 may access one or more third party circuitries in place of local circuitries for performing certain functions.

As will be appreciated based on this disclosure, various examples contemplated herein may be implemented by an apparatus 900. Furthermore, some examples may take the form of a computer program product comprising software instructions stored on at least one non-transitory computer-readable storage medium (e.g., memory 904). Any suitable non-transitory computer-readable storage medium may be utilized in such example systems, some examples of which are non-transitory hard disks, CD-ROMs, DVDs, flash memory, optical storage devices, and magnetic storage devices. It should be appreciated, with respect to certain devices embodied by apparatus 900 as described in FIG. 9, that loading the software instructions onto a computing device or apparatus produces a special-purpose machine comprising the means for implementing various functions described herein.

Figure 10A:
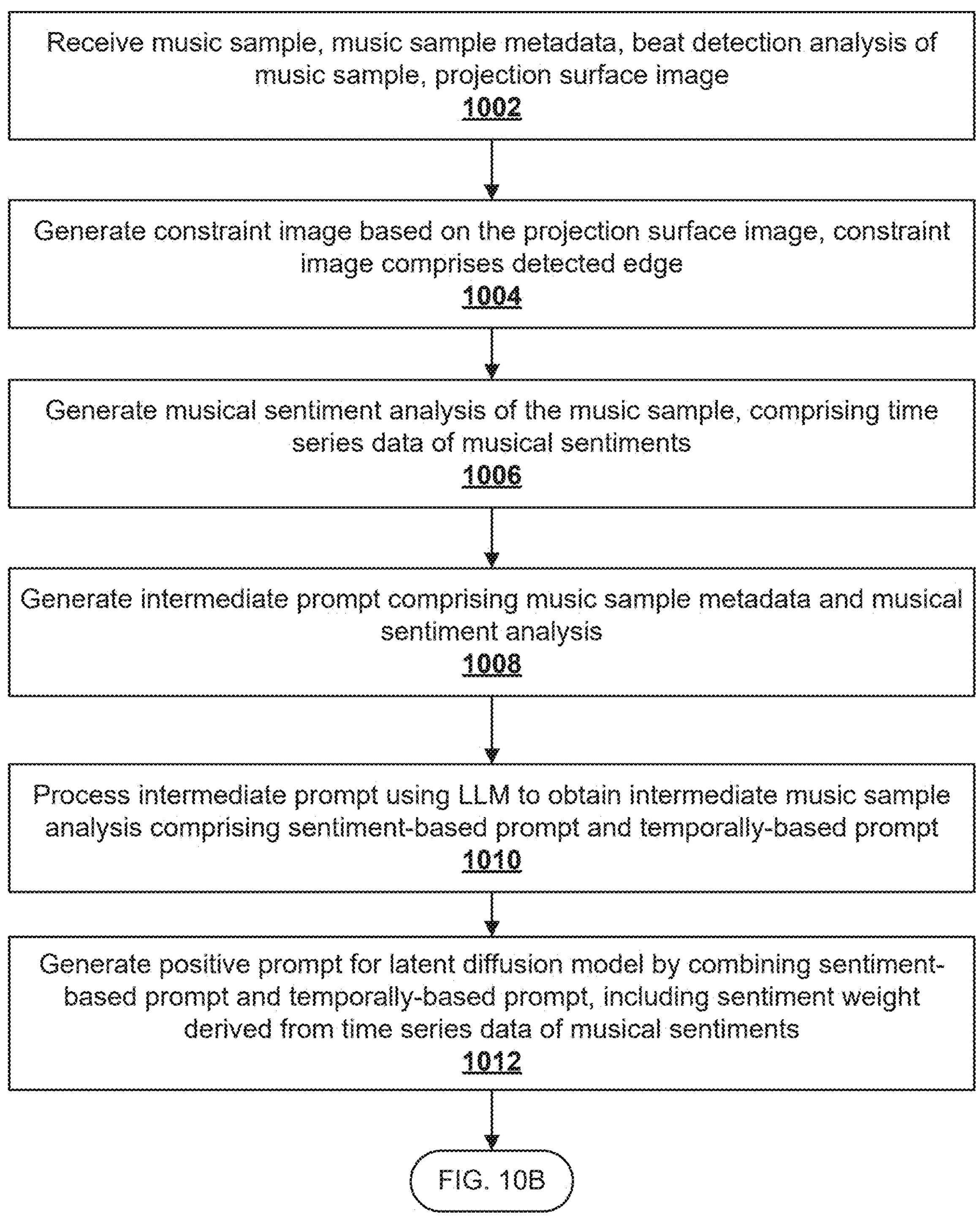
FIG. 10A and FIG. 10B are block diagrams illustrating an example process for providing scene-aware generation of music visualizations, in accordance with various aspects of the present disclosure.
Figure 10B:
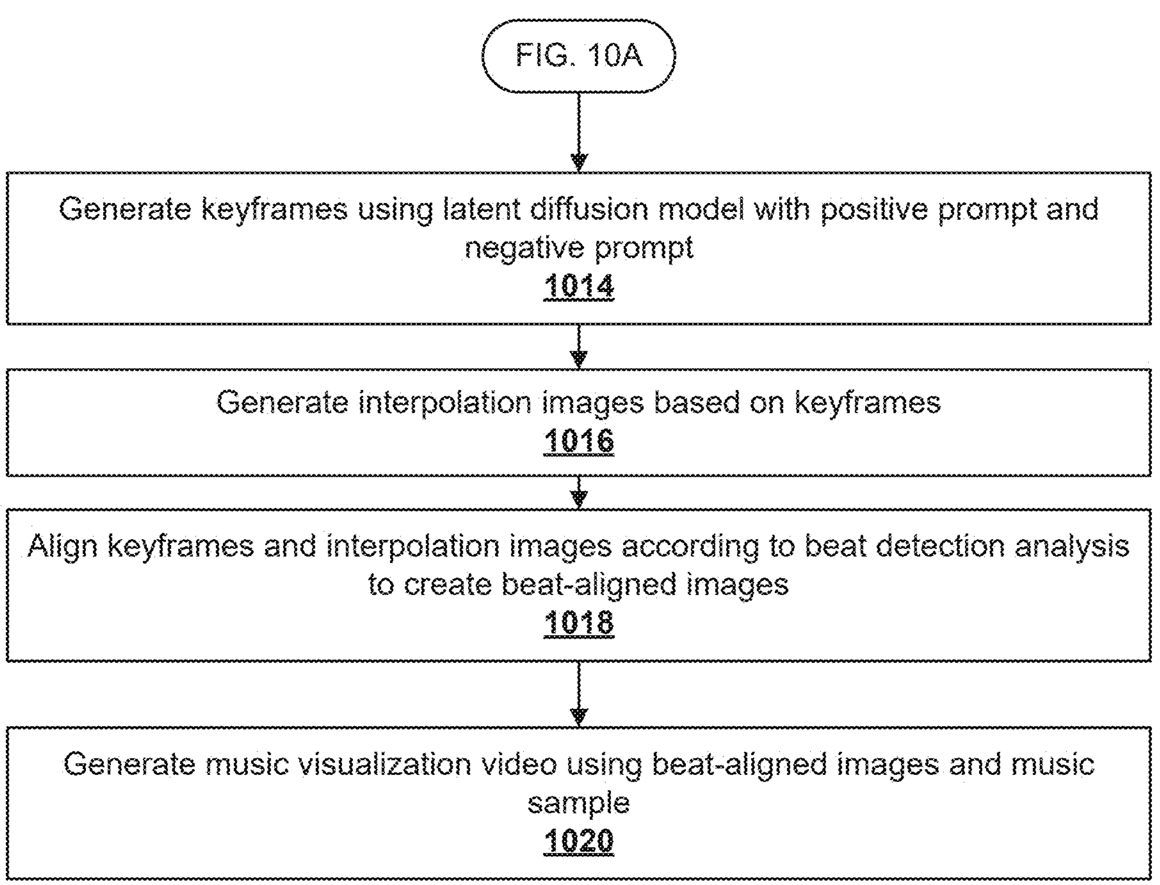

FIG. 10A and FIG. 10B are block diagrams illustrating an example process for providing scene-aware generation of music visualizations, in accordance with various aspects of the present disclosure. Example flowcharts are illustrated that contain example operations implemented by various examples described herein. The operations illustrated in FIGS. 10A-10B may, for example, be performed by a system embodied by an apparatus 800, which is shown and described in connection with FIG. 9. To perform the operations described below, the apparatus 900 may utilize one or more of processor 902, memory 904, communications hardware 906, projector 908, context camera 910, sensor hardware 912, and/or any combination thereof. It will be understood that user interaction with the apparatus 900 may occur directly via communications hardware 906, or may instead be facilitated by a separate user device, and which may have similar or equivalent physical componentry facilitating such user interaction.

As shown by operation 1002, the apparatus 900 includes means, such as processor 902, memory 904, communications hardware 906, context camera 910, sensor hardware 912, or the like, for receiving a music sample, music sample metadata, a beat detection analysis of the music sample, and a projection surface image. The projection surface image may be provided, for example, by the context camera 910 using the capabilities described previously. In various examples, the music sample may be received from a remote server via communications hardware 906, or may be retrieved from local storage such as memory 904. In various examples, the music sample may be received via sensor hardware 912, for example, if the music sample is detected by an attached microphone of the sensor hardware 912. In various examples, the music sample metadata may not be utilized, and information may be extracted directly from the music sample, or in various examples, the music sample may be processed and analyzed by the processor 902 to identify various metadata, which may in turn be used to retrieve full music metadata using communications hardware 906, for example, via the Internet. Likewise, the beat detection of the music sample may be performed using the processor 902 and instructions stored in memory 904 or other storage, or the beat detection may be retrieved via communications hardware 906.

In various examples, a characteristic analysis and/or sentiment analysis of the music sample may also be received. The characteristic analysis and/or sentiment analysis is described in further detail below in connection with operation 1006.

As shown by operation 1004, the apparatus 900 includes means, such as processor 902, memory 904, communications hardware 906, or the like, for generating a constraint image based on the projection surface image, wherein the constraint image comprises a detected edge from the projection surface image. As described previously in connection with FIG. 3, FIG. 6, and FIG. 8, various examples may produce an indication of a detected edge from the projection surface using an edge detection algorithm. The detected edge may be identified, stored, and communicated in any of a variety of ways, and the edge information may be transformed to and from various coordinate systems, visually transformed by inverting colors, filling or outline, and/or the like. The constraint image may be produced based on the projection surface image captured by the context camera 910, and the edge detection may be performed locally or, in various examples, the projection surface image or certain data derived from the projection surface image may be conveyed to a remote device via communications hardware 906 for edge detection to be performed. Although operation 1004 indicates the detection of a detected edge, it will be understood that a plurality of edges or, in some instances, no edges at all may be detected in the projection surface image. The detection of edges may also use predetermined configuration settings, stored, for example, in memory 904, that may adjust the sensitivity and/or other settings of the edge detection algorithm.

As shown by operation 1006, the apparatus 900 includes means, such as processor 902, memory 904, communications hardware 906, or the like, for generating a musical characteristic analysis of the music sample, where the musical characteristic analysis may include time series data of musical sentiments. A timestamp in the time series data may correspond to a sentiment. The characteristic analysis and/or sentiment analysis may be received via communications hardware 906 from a remote device, or may be retrieved from memory 904. In some instances, the characteristic analysis and/or sentiment analysis of the music sample received in operation 1002 may be performed using the processor 902 to generate the characteristic analysis and/or sentiment analysis locally. The processor 902 may use a characteristic analysis model or sentiment analysis model, which may be embodied as instructions stored in memory 904.

The beat detection analysis, characteristic analysis and/or sentiment analysis may include various timestamps. The timestamps may relate to timing of the music sample. For example, a music sample may have a duration of 5:10, and a beat detection analysis may detect a tempo of 60 beats per minute, or one beat at each second (e.g. timestamps 0:01, 0:02, 0:03, etc.). The characteristic analysis and/or sentiment analysis may likewise have timestamps, and the timestamps may be regularly spaced (e.g., at 10 second intervals, 0:10, 0:20, 0:30, etc.) or may be arbitrarily spaced based on changes in characteristic and/or sentiment. In general, the timestamps of the beat detection may not correspond to the timestamps of the characteristic analysis and/or sentiment analysis.

In various examples, an interpolation of the characteristic analysis and/or sentiment analysis may be performed to determine characteristics and/or sentiments at arbitrary timestamps. For example, as shown and discussed in connection with FIG. 4, various methods may be used to determine a continuous curve of sentiment values at any time value. The interpolated characteristic analysis and/or sentiment analysis values may be used to determine a characteristic and/or sentiment at each beat timestamp of the beat analysis. In this way, the system may determine characteristics and/or sentiments corresponding to each beat in the tempo of the music sample. The characteristic associated to a particular beat may be referred to as the beat characteristic. The timestamp corresponding to a particular characteristic may be referred to as a characteristic timestamp. The beat characteristic may be used to produce a prompt matching the beat characteristic, ultimately producing a keyframe to be displayed at or around the timestamp of the beat.

As shown by operation 1008, the apparatus 900 includes means, such as processor 902, memory 904, communications hardware 906, or the like, for generating an intermediate prompt comprising the music sample metadata and the musical characteristic analysis. The intermediate prompt may be a prompt intended to be provided to an LLM. The intermediate prompt may include introductory information to explain the problem, a format, expected output parameters, detailed instructions, and further guidance to the LLM. Finally, the intermediate prompt may include the formatted music sample metadata with elements of the sentiment analysis and other pre-configured settings.

An example of the introductory material provided in the intermediate prompt is "You are tasked with creating an engaging and immersive music visualization for a single song. You will describe the visuals with text descriptions, and put those in a JSON text format that will be parsed by video creation software that will generate the final video.

You will create the visuals by generating a set of image generation prompts for a text-based image generation model using latent diffusion. You will be given a number of sections in the song, and you will generate a sequence image prompts, one for each section, that tell a cohesive story and fit the vibe and theme of the music. In addition, you will be given a set of characteristics of the song, such as moods or feel of the music. You will generate an image prompt for each of these characteristics. These characteristics have time series data associated with them, and these values along with the images generated from the prompts will be used to generate the final video. The video will be created by displaying the section images during those sections, and each video frame is created by blending/mixing in the mood images into video based on the strength of the mood at that time." The example introductory text may be modified by or depend on the music metadata, music sample, sentiment analysis, and/or the like.

The intermediate prompt may further include an example format. An example of this portion of the intermediate prompt is "Prompt JSON format:{"section_number": image_prompt", "section_number": "image_prompt", "characteristic":"image_prompt"}". The example format section of the intermediate prompt provides the LLM with a structure text format, such as JSON, YAML, XML, or the like, to provide the output prompt.

The intermediate prompt may further include parameters to guide the LLM in generating a prompt. An example parameters section is "section_number: A section of the music video, in consecutive order starting at 0. Sections are divisions of the song that fit together. You will be told the number of sections in the video. characteristic: An emotion, mood, or other characteristic in the song, for example "energetic", "sad", "contemplative". You will be given a list of characteristics for the song. image_prompt: Image prompt for the latent diffusion model". The list and description of the parameters introduces and explains the terms that were used in the example format described above.

The intermediate prompt may further include step-by-step instructions for the LLM. The step-by-step instructions may include directions to create image prompts, ensure coherence between sections, create image prompts corresponding to each characteristic from the characteristic analysis, provide the output in the specified format, and to include any other extra details used for the particular example system. The intermediate prompt may also include a section of tips used to fine tune the response of the LLM, for example increasing the tendency to produce specific latent diffusion image prompts, moving the LLM toward choosing certain art style, avoiding potentially offensive images, providing instructions on the use of prompt weights, and/or the like.

Finally, the intermediate prompt may include the information from the music metadata, sentiment analysis, and other final pre-configured settings needed to generate the latent diffusion prompt. For example, the final section may include the artist, song name, duration, tempo, key, a brief verbal description of the music sample, and the formatted lyrics of the song. The prompt may include a list of characteristics, such as the three most important detected sentiments of the track. The prompt may include a number of sections, so that the LLM may generate an image prompt for each section.

As shown by operation 1010, the apparatus 900 includes means, such as processor 902, memory 904, communications hardware 906, or the like, for processing the intermediate prompt using a large language model to obtain an intermediate music sample analysis, wherein the intermediate music sample analysis comprises a characteristic-based prompt and a temporally-based prompt. The LLM may process the intermediate prompt, such as the example prompt given previously in connection with operation 1008. The resulting output from the LLM may accordingly include image prompts corresponding to the characteristics (e.g., moods, sentiments, etc.) provided to the LLM in addition to image prompts corresponding to the delineated sections of the music sample (e.g., a temporally based prompt).

An illustrative example of the intermediate music sample analysis, which may be processed to obtain a finalized prompt for the latent diffusion model, is as follows:

{"0": "A snowy landscape at dawn with barren trees, under a dark blue sky filled with stars, in the style of Vincent Van Gogh", "1": "A transition scene where the sun starts rising behind the horizon, the snow begins to melt, and the first signs of green start appearing, in the style of Claude Monet's Impressionism", "2": "A morning landscape where the sun shines brightly over lush green fields, and blooming flowers begin to appear, in the style of Georgia O'Keeffe", "3": "A scene of a sunlit forest with tall, green trees and a clear blue sky, animals awaken, and birds take flight, in the style of realism like Robert Bateman", "4": "An afternoon landscape where the sun is at its zenith, casting long shadows on the flourishing fields and clear brooks in the style of Thomas Cole's naturalism", "5": "A sunset scene where the sun descends into the horizon, painting the sky with shades of orange, pink, and red reflecting on a calm lake surrounded by fully blossomed trees, in the style of Bob Ross", "mood:happy": "Bright, lively colors dominating a landscape, such as sunny yellows, sky blues, and vivid greens, featuring frolicking animals and blooming flowers", "mood:chilled": "Serene elements like a calm lake under a clear sky, with fluffy white clouds and gentle waves lapping against the shore, in cool colors like blues and whites", "character:warm": "A golden sunlight bathing the landscape, creating long, deep shadows and highlighting the texture of the elements, like tree barks, flower petals, and grass blades"}

The intermediate music analysis may further include an introductory paragraph or other narrative output that may provide an overview of the intermediate music analysis.

As shown by operation 1012, the apparatus 900 includes means, such as processor 902, memory 904, communications hardware 906, or the like, for generating a positive prompt for a latent diffusion model by combining the characteristic-based prompt and the temporally-based prompt, wherein the combining includes a characteristic weight derived from the time series data of musical sentiments. The processor 902 may use a rules-based algorithm to construct the positive prompt or multiple positive prompts from the intermediate music analysis. By way of continued example from operation 1010, a positive prompt may be constructed by combining the section prompt and the characteristic prompts. In an instance in which a prompt belongs to section zero, has a "happy" weight of 0.2 and a "warm" weight of 0.8, the example positive prompt may be: "A snowy landscape at dawn with barren trees, under a dark blue sky filled with stars, in the style of Vincent Van Gogh, (Bright, lively colors dominating a landscape, such as sunny yellows, sky blues, and vivid greens, featuring frolicking animals and blooming flowers:0.2), (A golden sunlight bathing the landscape, creating long, deep shadows and highlighting the texture of the elements, like tree barks, flower petals, and grass blades:0.8)". The preceding example illustrates one combination of the section prompt (e.g., a temporally-based prompt) and two characteristic-based prompts. In various examples, producing the positive prompt may include applying weights to the characteristic-based prompt. The weights may be based on the sentiment analysis and/or characteristic analysis. For example, as shown in FIG. 4, a weight for the characteristics "bright", "optimistic" and "uplifting" may be determined for any arbitrary set of timestamps from the continuous distributions illustrated therein. Accordingly, a positive prompt may be constructed by merging the section prompt (e.g., temporally-based prompts) corresponding to a particular timestamp with the characteristic prompts (e.g., characteristic-based prompts) that also correspond to a particular timestamp.

In various examples, the procedure described above may be performed for each timestamp detected in the beat detection analysis. Accordingly, a positive prompt may be constructed for each beat in the music sample. It will be understood that the preceding example prompts, sentiments, and the like represent only one example system, and various examples disclosed herein need not follow the same procedure. For example, temporally-based prompt may correspond to beats rather than sections, or temporally-based-prompts may be weighted according to the timestamp of a music track, or other techniques may be used to combine the temporally- and characteristic-based prompt to form the positive prompts.

In various examples, the intermediate music analysis need not be limited to producing positive prompts, but may further generate negative prompts or other parameters to pass to the latent diffusion model for generating keyframes and/or the animation.

Negative prompts may be generated using a variety of techniques to improve the generated keyframes and subsequent animation. An example method for producing the negative prompt uses scene understanding information, such as the scene understanding methods described in connection with FIG. 1 for scene understanding 104. For example, the processor 902 may execute instructions stored in memory 904 to determine a visual property keyword based on the projection surface image. The visual property keyword may describe the color, texture, reflectivity, or other properties of the reflection surface. The processor 902 may subsequently generate a scene prompt using the visual property keyword. For example, the prompt "Question: If I want to project a background on a wall with yellow color, which background color is not recommended, why?" may be provided. The response to the scene prompt may be used to generate a negative prompt. For example, the response from the LLM may be processed to extract the essential details for a negative prompt, resulting in the negative prompt "pale yellow, white, light pastel colors, similar shades of yellow, bright colors with low contract" which may be subsequently provided together with the positive prompts to the latent diffusion model.

Additionally or alternatively, the positive prompts may be combined with a constraint image. An indication of the constraint image (e.g., the filename and/or path of the constraint image) may be provided in a latent diffusion prompt.

Turning now to FIG. 10B, as shown by operation 1014, the apparatus 900 includes means, such as processor 902, memory 904, communications hardware 906, or the like, for generating a set of keyframes using the latent diffusion model with the positive prompt. Given the positive prompt of operation 1012, the positive prompts may be formatted and combined with negative prompts and other latent diffusion settings to generate keyframes using latent diffusion. Accordingly, the latent diffusion prompt may include several elements and may use a structured plain text format. The latent diffusion prompt may include the indication of the constraint image (e.g., the filename and/or path), a set of positive prompts (e.g., a positive prompt for each detected beat, or a subset of the beats arranged so that prompts may be processed in parallel), the set of negative prompts (e.g., determined by the LLM prompt using the visual property keyword), and other details such as the number of frames, whether to use text-to-image or image-to-image processing, and parameters for animation generation and/or interpolation.

In various examples, the latent diffusion model may be configured to produce animations, and may automatically recognize the plurality of positive prompts as keyframes, organize the keyframes, provide interpolations, and produce an animation. In various examples, each positive prompt may be processed separately (e.g., in parallel) by a latent diffusion model, and the processor 902 may execute instructions to form an animation by combining keyframes and performing various interpolations to produce a smooth animation between keyframes.

In various examples, the latent diffusion prompt may include a combination of text-to-image and image-to-image prompts. The image-to-image prompts may be based on a text prompt and also a previously generated keyframe. For example, the diagram of FIG. 5 shows a scheme for generating images using text-to-image (e.g., txt2img) in parallel, followed by generation of images using image-to-image (e.g., img2img) also in parallel. The text-to-image keyframes and the image-to-image keyframes may be collected together and considered the keyframes of the animation (e.g., interpolation may be performed between the keyframes in connection with operation 1016).

In various examples, the positive prompts from the latent diffusion prompt may be clustered or grouped for more computationally efficient batch processing. The weighting method described in the above example leads to a large number of positive prompts that vary only in terms of the weight applied to components of each positive prompt. The positive prompts may be processed using batch mode, for example, as follows. One lightweight approach is to group such prompts together and discard the weight values, which may significantly reduce the number of text-to-image latent diffusion processing steps needed. In this example, a measure of similarity between prompts is determined by removing numerical weights and checking if the resulting prompts are identical. Rather than providing a new positive prompt for each variation of the prompt weights, a large set of text-to-image keyframes may be generated from the single prompt, one for each timestamp required, which may produce a batch keyframe for each relevant timestamp. Put another way, the processor 902 may determine a common prompt using a component common to each prompt from the prompt group. The component common to each prompt may include the text of each prompt while discarding the numerical weights.

For example, if beats 388 through 396, after removing weights, all have the prompt "The same landscape now at dawn, with a purple and pink sky hinting at the rising sun, frolicking animals and blooming flowers", the single prompt may be provided without weights and used to generate nine different images, one for each of the relevant frames. Since this batch method repeats only the final stages of the image generation, it is much more computationally efficient than the full latent diffusion process starting at a new text prompt for each keyframe.

In various examples, further computational efficiency may be achieved by utilizing lightweight computer vision algorithms to generate visual effects such as blurring and hue shifting, illustrated in FIG. 7. In lightweight applications, such as online mode, when available computing resources and/or available time are limited, simplified computer vision algorithms may be utilized. The simplified algorithms may replace the image-to-image latent diffusion step and enable more of the processing to be moved onto the local device rather than relying on cloud devices to perform heavyweight computing tasks. For example, a first keyframe may be generated using the example text-to-image procedures described previously. The text-to-image keyframe may be transformed using a hue shift to obtain a second keyframe, which may be referred to as a computer vision keyframe. Subsequently, in operation 1016, interpolation between the two keyframes may be performed. Thus the online mode example requires only a single latent diffusion processing step for each beat timestamp detected in the music sample.

As shown by operation 1016, the apparatus 900 includes means, such as processor 902, memory 904, communications hardware 906, or the like, for generating a set of interpolation images based on the set of keyframes. The interpolation images may be generated using any of a variety of techniques, depending on the example system and the mode in which the example operates. As mentioned previously, various examples disclosed herein may include dynamic modes for generation of music visualization based on available resources, and interpolation images may be generated using more sophisticated, heavyweight algorithms in certain modes, or may be generated using faster lightweight algorithms in other mode.

In various examples, the interpolation images may be generated by a built-in method of the latent diffusion model, such as an optical flow algorithm for frame interpolation. Such methods may be computationally heavy, and more lightweight methods may be utilized instead to reduce computation load, even when operating in offline mode or using cloud resources. Particularly, the frame interpolation method may proceed serially and prevent parallel processing of the interpolation of keyframes, which may limit the flexibility of implementation for various examples disclosed herein.

In various examples, the interpolation between keyframes may be performed by a dedicated interpolation model. The interpolation model may be sufficiently lightweight to use on local processing hardware, as illustrated in FIG. 5 for offline mode. Furthermore, a dedicated interpolation model may enable parallel processing of sets of keyframes, also illustrated in FIG. 5. The interpolation may be performed by any visual interpolation algorithm known in the art. The interpolation may produce a sequence of interpolation images depending on the desired framerate and settings provided to the interpolation model.

As shown by operation 1018, the apparatus 900 includes means, such as processor 902, memory 904, communications hardware 906, or the like, for aligning the set of keyframes and the set of interpolation images in time steps according to the beat detection analysis of the music sample to create a set of beat-aligned images aligned to beats detected using the beat detection analysis. The alignment may be performed by the processor 902, wherein the processor 902 may order each generated keyframe and interpolation frame according to the timestamp corresponding to each keyframe, placing the interpolation frames between their corresponding keyframes. By aligning the keyframes with the beat detection timestamps, the resulting animation may result in a keyframe appearing in the animation for each detected beat of the music sample.

As shown by operation 1020, the apparatus 900 includes means, such as processor 902, memory 904, communications hardware 906, or the like, for generating a music visualization video using the set of beat-aligned images and the music sample. The processor 902 may use any video generation algorithm known in the art, for example, by executing instructions stored in memory 904. The video generation may include resizing adding the audio track, compressing the resulting video, and/or other steps of video rendering. The video generation may further include any desired post-production steps applied to the final music visualization, such as visual adjustments, framerate adjustments, audio quality adjustments, video codec selection, and/or the like.

In various examples, the apparatus 900 may further project the generated music visualization video onto a projection surface using a projector 908. The projected music visualization video may incorporate edge information from the edge detection steps described previously to create a projection that integrates with the projection surface and surrounding area.

In accordance with one or more implementations, an electronic device comprises a plurality of cameras, one or more projectors, one or more microphones (e.g. a microphone array), one or more speakers, and one or more wireless communication components (e.g. one or more wireless transceivers). In accordance with one or more implementations, an electronic device is configured to be mounted to a ceiling and comprises a downward facing 2-pi steradian camera or hemispherical camera.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

receiving a projection surface image;

generating a constraint image based on the projection surface image, wherein the constraint image comprises a detected edge from the projection surface image;

outputting, using a speaker of a projector device, sound representing a music track;

determining, based on beat detection data for the music track, a first set of timestamps, the first set of timestamps including a first timestamp and a second timestamp;

generating, at a remote system using a machine learning model, first image data representing a start image for a first time corresponding to the first timestamp, wherein a shape of the first image data is constrained according to the constraint image;

generating, at the remote system using the machine learning model and the first image data, second image data representing an end image for a second time corresponding to a time immediately prior to the second timestamp; wherein a shape of the second image data is constrained according to the constraint image;

sending, from the remote system to the projector device, the first image data and the second image data;

generating, at the projector device using the machine learning model and the first image data and the second image data, third image data representing one or more interpolated images generated based on the start image and the end image; and projecting, using a projector of the projector device and the first image data, the second image data, and the third image data, a music visualization time-aligned to the music track and shaped according to the constraint image, the music visualization comprising the start image, the end image, and the one or more interpolated images.

2. The method of claim 1, wherein the generating of the second image data involves an image to image generation approach using a latent diffusion model.

3. The method of claim 1, wherein the generating of the first image data involves a text to image generation approach using a latent diffusion model.

4. The method of claim 1, wherein the generating of the third image data involves an interpolation approach using a latent diffusion model.

5. The method of claim 1, wherein the generating of the second image data involves an image to image generation approach using a latent diffusion model;

wherein the generating of the first image data involves a text to image generation approach using a latent diffusion model; and wherein the generating of the third image data involves an interpolation approach using a latent diffusion model;

whereby using beat detection data to determine timestamps for use in defining segments of a music track enables parallel processing and generation of the initial image and final image of an image sub-sequence at the remote system but generation of intermediate images using interpolation at the projector device.

6. The method of claim 1, wherein the projector device is mounted to a ceiling.

7. The method of claim 1, wherein the projecting of the music visualization comprises projecting the initial image at a time corresponding to the first time.

8. The method of claim 1, wherein the projecting of the music visualization comprises projecting the final image at a time corresponding to the second time.

9. A method comprising:

outputting, using a speaker of a projector device, sound representing a music track;

determining, based on beat detection data for the music track, a first set of timestamps, the first set of timestamps including a first timestamp and a second timestamp;

generating, at a remote system using a machine learning model, first image data representing a start image for a first time segment associated with the first timestamp, wherein generating the first image data uses an edge constraint from a constraint image;

generating, at the remote system using the machine learning model and the first image data, second image data representing an end image for the first time segment, wherein generating the second image data uses the edge constraint from the constraint image;

sending, from the remote system to the projector device, the first image data and the second image data;

generating, at the projector device using the machine learning model and the first image data and the second image data, third image data representing one or more interpolated images generated based on the start image and the end image; and projecting, using a projector of the projector device and the first image data, the second image data, and the third image data, a music visualization time-aligned to the music track, the music visualization comprising the start image, the end image, and the one or more interpolated images, wherein the music visualization is shaped according to the edge constraint from the constraint image.

10. The method of claim 9, wherein the generating of the second image data involves an image to image generation approach using a latent diffusion model.

11. The method of claim 9, wherein the generating of the first image data involves a text to image generation approach using a latent diffusion model.

12. The method of claim 9, wherein the generating of the third image data involves an interpolation approach using a latent diffusion model.

13. The method of claim 9, wherein the generating of the second image data involves an image to image generation approach using a latent diffusion model;

wherein the generating of the first image data involves a text to image generation approach using a latent diffusion model; and wherein the generating of the third image data involves an interpolation approach using a latent diffusion model;

whereby using beat detection data to determine timestamps for use in defining segments of a music track enables parallel processing and generation of the initial image and final image of an image sub-sequence at the remote system but generation of intermediate images using interpolation at the projector device.

14. The method of claim 9, wherein the method comprises generating the beat detection data.

15. The method of claim 9, wherein the method comprises accessing the beat detection data at the remote system.

16. The method of claim 9, wherein the method comprises generating the beat detection data at the remote system.

17. The method of claim 9, wherein the projector device is mounted to a ceiling.

18. A method comprising:

receiving a music sample, a beat detection analysis of the music sample, and a characteristic analysis of the music sample, wherein the beat detection analysis of the music sample comprises a beat timestamp, wherein the characteristic analysis of the music sample comprises a first characteristic timestamp, a first characteristic, a second characteristic timestamp and a second characteristic;

interpolating the first characteristic timestamp and the second characteristic timestamp using the beat timestamp to derive a beat characteristic;

generating a positive prompt, wherein the positive prompt comprises the beat characteristic;

generating, using a latent diffusion model and the positive prompt, a first keyframe and a second keyframe, wherein generating the first keyframe and the second keyframe uses an edge constraint from a constraint image; and generating a music visualization video comprising the first keyframe, the second keyframe, and the music sample, wherein the first keyframe is timed to occur at the beat timestamp, wherein the music visualization video is shaped according to the edge constraint from the constraint image.

19. The method of claim 18, wherein the method comprises:

generating, by an interpolation model, an interpolation image that interpolates the first keyframe and the second keyframe, wherein the interpolation model is executed by a first device, wherein the latent diffusion model is executed using a second device, wherein the music visualization video further comprises the interpolation image.

20. The method of claim 18, further comprising:

generating a text-to-image prompt comprising the first characteristic, wherein the positive prompt comprises the text-to-image prompt, wherein the first keyframe corresponds to the text-to-image prompt; and generating a image-to-image prompt comprising the first characteristic and an indication of the first keyframe, wherein the positive prompt comprises the image-to-image prompt;

wherein the second keyframe corresponds to the image-to-image prompt.

* * * * *